United States Patent [19]

Anmahian

[11] 4,393,758
[45] Jul. 19, 1983

[54] FOOD PROCESSING APPARATUS

[75] Inventor: Al Anmahian, El Monte, Calif.

[73] Assignee: Electra Food Machinery, Inc., El Monte, Calif.

[21] Appl. No.: 284,171

[22] Filed: Jul. 17, 1981

[51] Int. Cl.³ .............................. A21C 9/00; A21C 9/06
[52] U.S. Cl. .................................. 99/450.6; 53/266 R; 99/450.7; 425/511; 425/515
[58] Field of Search .................. 99/356, 404, 407, 427, 99/450.1–450.8; 425/383, 397, 447, 363, 334, 366, 373, 110, 112, 511, 515; 141/158, 168; 53/266 R

[56] References Cited

U.S. PATENT DOCUMENTS 2,905,105 9/1959 Lombi .............................. 99/450.6
4,084,493 4/1978 Quintana ........................... 99/450.7

Primary Examiner—Timothy F. Simone
Attorney, Agent, or Firm—James E. Brunton

[57] ABSTRACT

An apparatus for the automatic high volume production of Mexican food products such as enchiladas and burritos. The apparatus of the invention is a unique combination which includes an endless conveyor upon which the outer food layer, or tortilla, is placed, a dispenser station for controllably dispensing a precise amount of food filler onto the tortilla, a plurality of shaped forming wheels adapted to cooperate with the conveyor to fold the tortilla over and about the filler so as to encapsulate it within the tortilla and a mechanism for inverting the product thus formed for automatic packaging and shipment.

7 Claims, 9 Drawing Figures

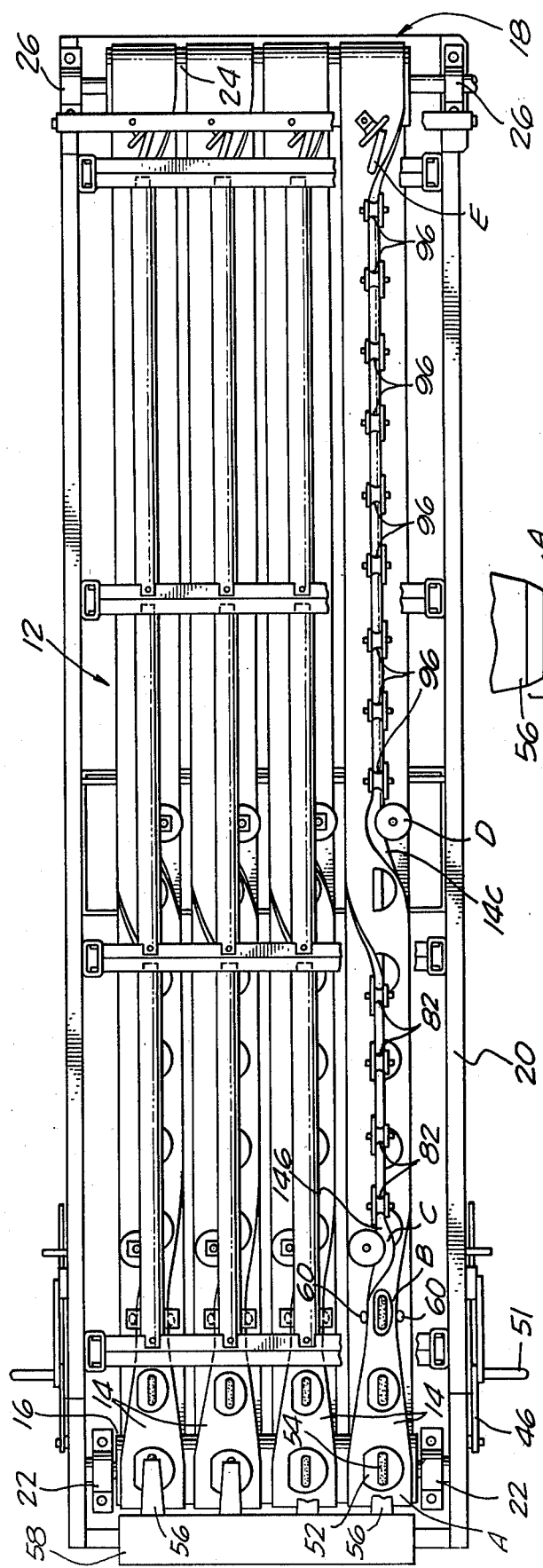

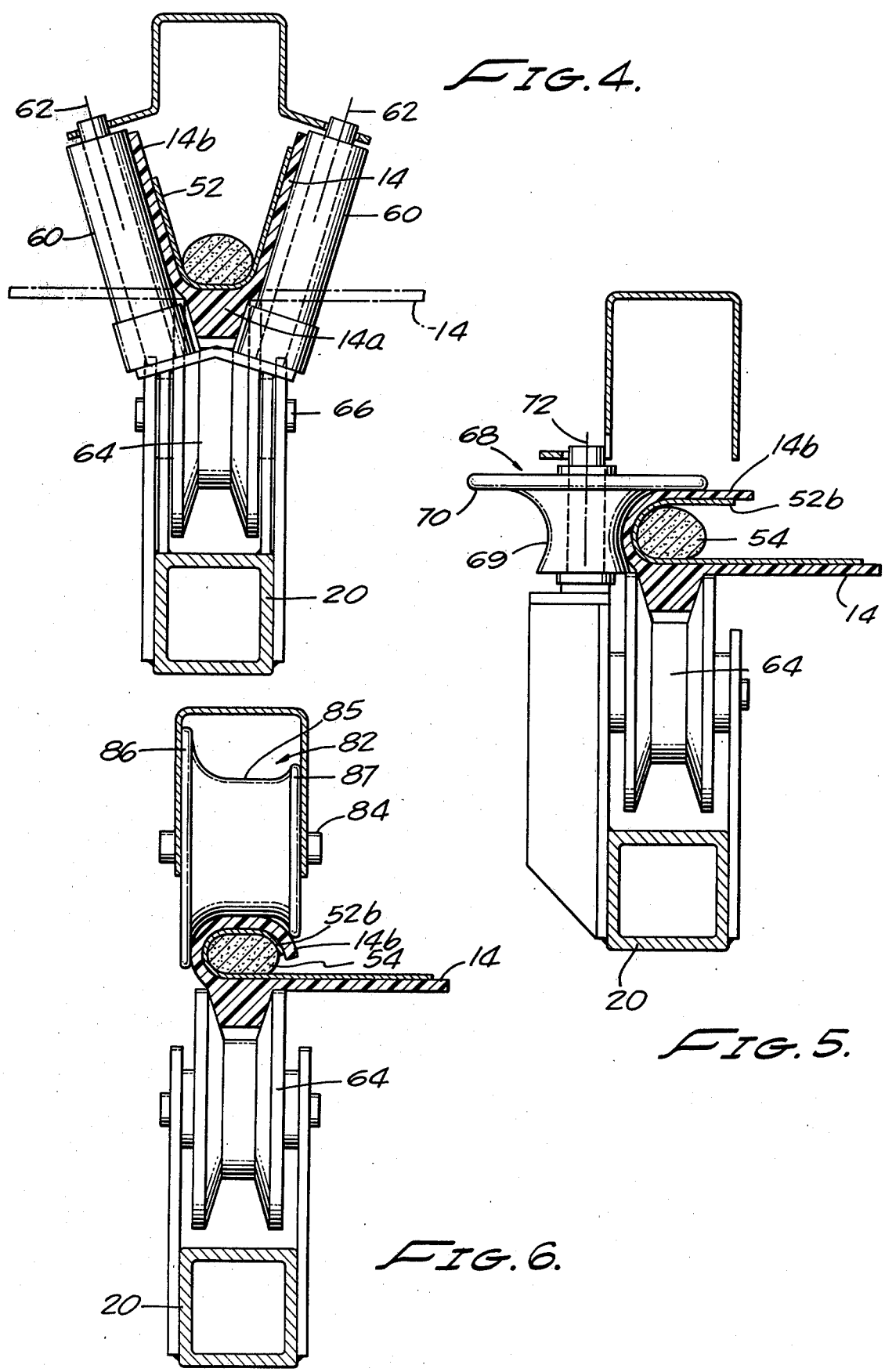

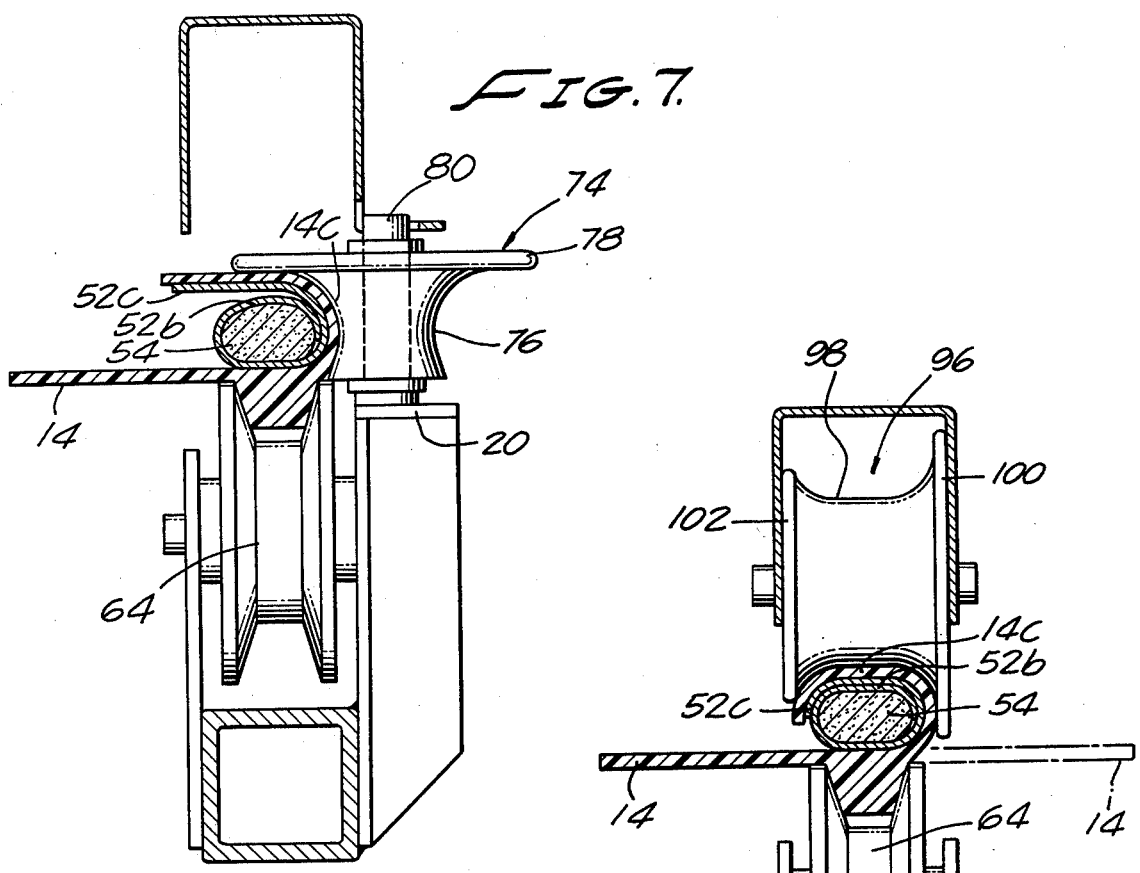
FIG. 7.
FIG. 8.
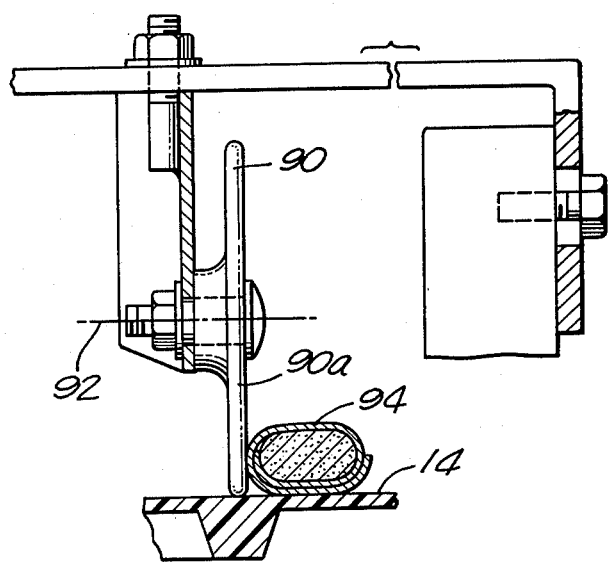
FIG. 9.

FOOD PROCESSING APPARATUS

BACKGROUND OF THE INVENTION

1. Field of the Invention

The present invention relates generally to a novel apparatus for the automatic preparation of certain rolled foodstuffs which are conventionally manually formed. More particularly the invention concerns a unique apparatus for the high volume, fully automatic production of Mexican food products such as enchiladas, burritos and the like.

2. Discussion of the Prior Art

Certain rolled food products such as burritos, enchiladas, egg rolls, cabbage rolls, blintzes and the like are traditionally formed by hand immediately prior to cooking. Such foods have a common configuration which includes an outer wrap and a pliant inner filler. Due to the fragile nature of the outer wrap, such as the tortilla, few reliable mechanisms for automatically producing such rolled food products in large volume have been developed. Those which have been developed are expensive to construct and maintain and typically are of complicated design involving the use of many component parts.

The popularity of frozen foods, the spiraling cost of labor, the increased sanitary restrictions placed on food products and the great demand for rolled food products, particularly Mexican food products, has created a great demand for reliable, fully automatic food processing equipment. In response to this demand the unique apparatus of the present invention has been developed.

The basic objectives of the present invention is to provide a highly reliable fully automatic apparatus for processing rolled food products which overcomes the deficiencies of the prior art devices known to applicant.

The apparatus described in the following patents, which patents represent the most pertinent prior art known, serve to clearly demonstrate the novelty of the apparatus of the present invention:

| Patent No. | Inventor |
| --- | --- |
| 2,352,477 | Powers |
| 2,577,925 | Sternbach |
| 3,570,393 | Schy |
| 3,724,361 | Schafer |
| 3,757,676 | Pomara |

SUMMARY OF THE INVENTION

In summary, the apparatus of the present invention comprises in its simplest form a foldable conveyor belt adapted to receive the outer layer of the product in planar form, means for dispensing a predetermined amount of filler onto the outer layer, a plurality of forming wheels for folding the conveyor and in turn the outer product layer about the filler to form a filler-containing envelope or shell, and an inverting mechanism to properly orient the product for packaging.

It is a particular object of the invention to provide an apparatus of the aforementioned character which automatically prepares filled food products such as Mexican enchiladas and burritos in high volume at a very rapid rate.

It is another object of the invention to provide an apparatus of the character described which may be used in either single or multiple row configurations for producing very large quantities of food products.

It is a further object of the invention to provide an apparatus of the class previously described which is fully automatic so that the operator need not touch the food or food product during processing.

It is another object of the invention to provide an apparatus of the foregoing character which will repeatedly produce food products of an identical size, shape and weight.

It is still another object of the invention to provide an apparatus of the class described which is highly reliable, which can be operated by relatively unskilled operators, which is safe to use and which can be easily installed in a food processing assembly line.

Finally, it is an object of the invention to provide an apparatus as described in the preceeding paragraphs which has a minimum number of moving parts and which can be easily and inexpensively manufactured and maintained.

BRIEF DESCRIPTION OF THE DRAWINGS

FIG. 2 is a plan view of the apparatus.

FIG. 3 is an enlarged fragmentary cross-sectional view taken along lines 3—3 of FIG. 1 showing the outer product wrap and the food filler in place on the flexible conveyor belt.

FIG. 4 is an enlarged fragmentary cross-sectional view taken along lines 4—4 of FIG. 1 illustrating the initial folding of the conveyor belt and the outer wrap or tortilla.

FIG. 5 is an enlarged fragmentary cross-sectional view taken along lines 5—5 of FIG. 1 showing a first portion of the tortilla being folded about the filler material.

FIG. 6 is an enlarged fragmentary cross-sectional view taken along lines 6—6 of FIG. 1 illustrating the manner in which the folded tortilla is maintained in pressural engagement with the filler as the tortilla is moved longitudinally of the apparatus.

FIG. 7 is an enlarged fragmentary cross-sectional view taken along lines 7—7 of FIG. 1 showing a second portion of the tortilla being folded about the filler material.

FIG. 8 is an enlarged fragmentary cross-sectional view taken along lines 8—8 of FIG. 1 showing the manner in which the fully folded tortilla is maintained in pressural engagement with the filler material as the food product travels longitudinally of the apparatus.

FIG. 9 is an enlarged fragmentary cross-sectional view taken along lines 9—9 of FIG. 1 showing the mechanism for inverting the formed food product to position it for packaging.

DESCRIPTION OF ONE FORM OF THE INVENTION

Figure 1:
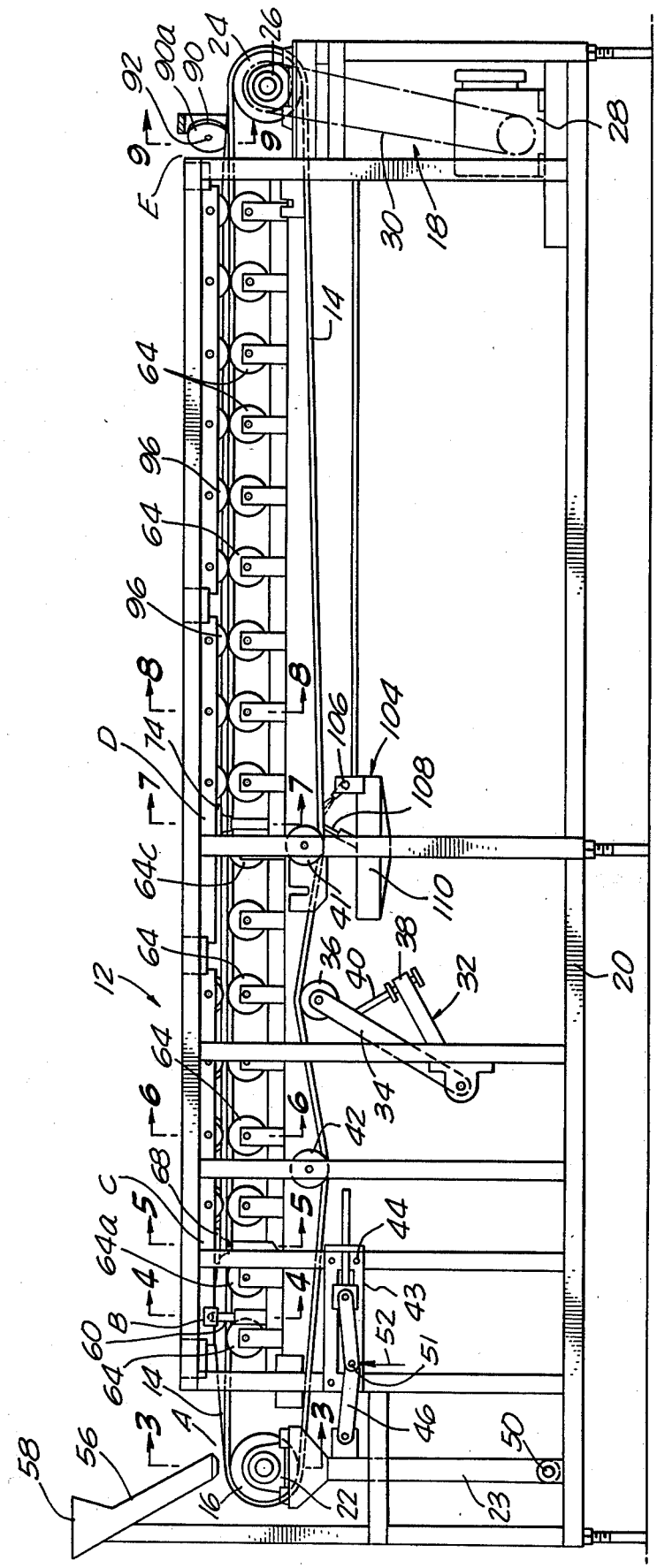
FIG. 1 is a side elevational view of the apparatus of the invention.

Referring now to the drawings, and particularly to FIGS. 1 and 2, the apparatus of the invention can be seen to comprise an elongated conveyor system generally designated by the numeral 12. In the form of the invention shown in the drawings, the conveyor system comprises a plurality of yieldably deformable endless conveyor belts 14 disposed in a side by side relationship with each belt being driven around a rotatable drum 16 by means of a drive system generally designated by the numeral 18. The conveyor belts 14, the drum 16 and the drive system 18 are all carried by a framework or superstructure 20.

It is to be understood that the apparatus of the invention can be constructed with a single conveyor belt, or with several as depicted in the drawings. Since the forming operation is identical for each of the conveyor belts, in the discussion which follows, the forming operation will be described in terms of a single conveyor belt, it being understood that several forming operations are occurring simultaneously.

As best seen by referring to FIG. 2, drum 16 extends transversely of the framework 20 and is rotatably supported on said framework by suitable bearings 22 located at either end of the drum. As illustrated in FIG. 1 bearings 22 are carried by vertically disposed standards 23 which are pivotally connected proximate their bases to superstructure 20.

The drive system 18, which is carried at the forward, or right end of framework 20, comprises a drum 24 which extends transversely of framework 20 and is rotatably supported by suitable bearings 26. Referring again to FIG. 1, it can be seen that drum 24 is rotatably driven by means of a variable speed electric motor 28 which is drivably coupled with drum 24 by means of a drive belt 30.

Also comprising a part of the conveyor system of the invention is an adjustable conveyor belt tensioning system 32 (FIG. 1) which is adapted to maintain tension on each of the endless conveyor belts 14. This tensioning system 32 comprises for each belt 14 a pivotal arm 34 connected at one end to the framework 20 and having at the other end a roller 36 adapted to pressurally engage the lower surface of the conveyor belt 14. A second arm 38 extends from framework 20 and carries a threaded member 40 adapted to raise and lower pivotal arm 34 so as to enable adjustment of the tension on each of the belts 14.

With the apparatus in the operating mode shown in the drawings, activation of motor 28 will cause rotation of drum 24 which in turn drives the conveyor belts 14 under an idler 41, over roller 36, under another idler 42 and then under drum 16.

The conveyor system of the present invention also includes a quick release safety mechanism generally designated in FIG. 1 by the numeral 43. This mechanism is adapted to enable quick shutdown of the apparatus in an emergency and comprises a guide frame 44 rigidly mounted on superstructure 20 and a linkage arrangement 46, one end of which is reciprocally carried within tracks defined by guide frame 44. The other end of the linkage 46 is pivotally connected to supporting standard 23 which, as previously discussed, supports drum 16. As indicated in FIG. 1, the standards 23 are pivotally connected at 50 to framework 20. With the assemblage in the position illustrated in FIG. 1, the linkage 46 maintains the supporting standards 23 in a substantially vertical orientation maintaining tension of the belts 14. However, an upward force exerted against the laterally extending rod 51 (FIG. 2) located at the pivot point of the linkage and in the direction indicated by the arrow 52 (FIG. 1) will cause standards 23 and drum 16 to pivotally move forwardly of the apparatus thereby instantaneously releasing the tension on the belts 14. This, of course, will immediately stop the travel of each of the belts so that appropriate corrective action can be taken.

To accomplish the folding operations necessary to encapsulate the filler material within the outer wrap or tortilla, several variously configured forming wheels are provided at spaced apart locations along the superstructure 20. As will be discussed in greater detail hereinafter, these forming wheels interact in a unique manner with the conveyor belts with some being adapted for rotation about horizontally extending axes and others being adapted for rotation about vertically extending axes.

Referring once again to FIG. 1, the various operations which must be accomplished in forming the folded food product are identified by the letters A through E. At position A, the outer wrap, or tortilla, 52 is placed onto the conveyor 14 and the food filler 54 is automatically deposited onto the tortilla through a plurality of deposition conduits or spouts 56 which depend from a transversely extending hopper 58. Spouts 56 are disposed at the approximate centerline of each conveyor belt 14 and each includes a suitable valving mechanism (not shown) for controllably metering the deposition of a predetermined amount of the filler material onto the tortillas.

Located at position B are first means for moving the conveyor belt 14 into a generally "V" shaped cross-sectional configuration so as to fold the side portions of the outer wrap, or tortilla, transverse to the line of travel of the conveyor. As best seen by turning to FIG. 4, in this embodiment of the invention the first means comprises a pair of angularly, upwardly extending rollers 60 carried by framework 20. Rollers 60 are adapted to rollably engage the under side of the conveyor belt 14 and rotate about axes 62 which extend at an angle with respect to the plane of the conveyor belt 14. As can be seen by also referring to FIG. 1, rollers 60 are located immediately forwardly of one of a series of guide rollers or sheaves 64 each of which is carried by framework 20 and is adapted to rotate about a horizontally disposed axle 66. Sheaves 64 are spaced longitudinally of framework 20 and are adapted to guide the travel of the belt as it moves forwardly of the apparatus. As indicated in FIG. 4, each sheave 64 is configured to closely receive a substantially "V" shaped central portion 14a of belt 14 which portion extends the entire length of the belt and depends downwardly from the lower surface thereof. It is the cooperative interaction between the longitudinally spaced apart sheaves 64 and the central portion 14a of the belt which maintains the belt exactly centered with respect to the forming wheels of the apparatus as the belt moves forwardly toward drive roller 24.

At position C there is provided second means cooperatively associated with the previously described first means for moving a first side portion of the conveyor belt 14 transverse to the line of travel of the belt so as to move a corresponding first side portion of the tortilla into overlapping pressural contact with the filler material. Referring to FIG. 5, in this form of the invention, the second means comprises a flanged wheel 68 disposed on the left hand side 14b of conveyor belt 14 as viewed in FIG. 2. Wheel 68 comprises a concave central body portion 69 and an upper flange portion 70. As illustrated in FIG. 5, wheel 68 is adapted to rotate about an axis 72 which is disposed generally perpendicular to the plane of conveyor belt 14.

Referring again to FIGS. 1 and 2, it can be seen that flanged wheel 68 is located forwardly of the angularly upwardly extending rollers 60 and immediately forwardly and above a second guide sheave 64a. With this arrangement, the left hand side portion 14b of the conveyor belt 14 is moved from the upwardly inclined position shown in FIG. 4 into the overlapping, horizontally extending orientation shown in FIG. 5. This movement of the conveyor belt, of course, concomitantly moves the first side portion 52b of the tortilla into the overlapping pressural contact with the filler material 54.

Located at position D is third means for moving a second portion of conveyor belt 14 transversely to the line of travel of the belt to move a corresponding second side portion of the tortilla into overlapping pressural contact with the first portion 52b of the tortilla, so as to form a shaped product wherein the filler material 54 is substantially encapsulated within the wrap.

As seen in FIG. 7, in the embodiment of the invention thereshown, this third means comprises a flanged wheel 74 of similar configuration to flanged wheel 68. Like wheel 68, flanged wheel 74 comprises a concave body portion 76 and an upper flanged portion 78. This flanged wheel, however, is disposed on the opposite, or right hand side, 14c, of the conveyor belt 14. Flanged wheel 74, like wheel 68, is adapted to rotate about a substantially vertically extending axle 80 carried by framework 20.

Referring once again to FIGS. 1 and 2, it can be seen that flanged wheel 74 is located substantially forwardly of flanged wheel 68 and immediately forwardly of yet another in the series of guide sheaves 64 designated in FIG. 1 by the numeral 64c. As clearly illustrated in FIGS. 2 and 7, flanged wheel 74 is constructed and arranged so as to engage the right hand side portion 14c of the conveyor belt 14 and deform it transversely to the line of travel of the belt whereby a second side portion 52c of the tortilla is moved into overlapping pressurial contact with the first side portion 52b of the tortilla. With this operation, the filler material 54 becomes substantially encapsulated within the tortilla 52.

Referring now to FIGS. 1, 2 and 6, it can be seen that disposed intermediate the second and third means of the invention is a fourth means for maintaining the first portion 52b of the tortilla in pressural contact with the filler as the tortilla is moved forwardly of the apparatus from position C to position D. As can also be seen by referring to FIG. 1, several guide sheaves 64 are also provided intermediate said first and second means and function to maintain the conveyor belt 14 in a centered relationship with respect to the forming wheels. Considering particularly FIGS. 2 and 6 of the drawings, in the embodiment of the invention thereshown, the fourth means can be seen to comprise a plurality of longitudinally spaced apart flanged wheels 82 disposed above conveyor belt 14. As illustrated in FIG. 6, flanged wheels 82 are adapted to rotate about axles 84 which are carried by superstructure 20 and which are disposed in a substantially parallel relationship with respect to the plane of the conveyor belt 14 in its undeformed configuration. Each flanged wheel 82 comprises a concave body portion 85, an outer flange portion 86 and an inner flange portion 87. Body portion 84 is configured to deform the left hand side portion 14b of the conveyor belt 14 in such a manner as to cause the first portion 52b of the tortilla to closely form around the filler material 54 in the manner shown in FIG. 6.

At position E of the apparatus, there is provided fifth means for inverting the fully folded food product from a position wherein the overlapping portions of the tortilla are above the conveyor belt 14 to the position illustrated in FIG. 9 wherein the overlapping portions of the tortilla are in engagement with the conveyor belt 14.

Referring particularly to FIGS. 2 and 9, in the present form of the invention, the fifth means comprises a disc shaped wheel 90 disposed above and rotatably driven by conveyor belt 14. As shown in FIGS. 1 and 3, the axis of rotation 92 of wheel 90 is disposed at an angle with respect to the direction of travel of conveyor belt 14. With this arrangement, as the folded food product travels forwardly of the apparatus, it will engage the angularly extending forward face 90a of the disc shaped wheel 90. As the folded food product moves into engagement with the rotating wheel 90, frictional forces will be set up tending to roll the food product relative to its longitudinal axis so as to move it from the position illustrated in FIG. 8 into the inverted position illustrated in FIG. 9. With the fully folded food product thus formed (designated by the numeral 94 in FIG. 9) in the inverted position, gravity will maintain the folded first and second portions of the tortilla and engagement with the food filler so that the product may be conveniently moved to a packaging station located forwardly of the apparatus (not shown).

Turning to FIGS. 1, 2 and 8, there is illustrated a sixth means of the apparatus of the invention. This sixth means is disposed intermediate the third and fifth means of the invention, that is between positions D and E, and functions to maintain the second portion of the tortilla 52c in pressural contact with the first portion 52b of the tortilla as the food product moves forwardly of the apparatus between positions D and E. As illustrated in FIG. 6, in the present embodiment of the invention, the sixth means is provided in the form of a plurality of longitudinally spaced apart flanged wheels 96 which are of similar construction to the previously described flanged wheels 82. Like wheels 82, flanged wheels 96 are disposed immediately above conveyor belt 14 and each includes a concave central portion 98, an outer flanged portion 100 and an inner flanged portion 102. The function of flanged wheels 96 is also similar to the function performed by flanged wheels 82, namely the deformation of a portion of the conveyor belt 14 in a manner so that, as shown in FIG. 8, the second portion 52c of the tortilla 52 is maintained in close pressural engagement with the first portion 52b of the tortilla as the folded food product moves between position D and E.

As indicated by referring to FIG. 1, disposed intermediate position D and E are a plurality of guide sheaves 64 adapted to maintain the conveyor belt 14 in a centered relationship with respect to the forming wheels.

As best seen in FIG. 1, provided below the conveyor belt 14 is a belt cleaning means generally designated by the numeral 104. In the present form of the invention this cleaning means comprises a fluid jet assembly 106 adapted to spray a cleaning fluid such as water or solvent onto the upper or product engaging surface of the belt. Also forming a part of the cleaning means is a scraper, or squeegee 108 adapted to frictionally engage the belt and remove the cleaning fluid and particulate matter therefrom. As indicated in FIG. 1 the cleaning means is supported by the superstructure 20. The fluid jet assembly 106 may be driven by a fluid pump or it may be connected to a source of fluid under pressure. A fluid catch and return basin 110 is provided below the jet assembly to retain the excess fluid sprayed onto the belt.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An apparatus for forming a Mexican food product having an exterior wrap comprising a tortilla and an inner filling, comprising:
   (a) an elongated longitudinally extending supporting frame work;
   (b) a driving drum rotatably supported proximate one end of said framework;
   (c) a driven drum rotatably supported forwardly of said driving drum rotatably supported proximate one end of said framework;
   (d) a continuous, yieldably deformable endless conveyor belt carried by said driving and driven drums, said belt having an upper and a lower surface, said lower surface including a downwardly depending "V" shaped protuberance extending the entire length of said belt;
   (e) means for driving said driving drum at a predetermined rate of speed;
   (f) a pair of angularly, upwardly extending rollers supported by said framework and adapted to rollably engage the lower surface of said conveyor belt said rollers being adapted to rotate respectively about axes extending at an angle with respect to the plane of said conveyor belt;
   (g) a first flanged wheel supported by said framework and disposed on a first side of said conveyor belt, said wheel being adapted to rotate about an axis disposed generally perpendicular to the plane of said conveyor belt; and being adapted to fold a first portion of said conveyor belt transverse to the line of travel of the belt to move a first side portion of the tortilla into overlapping pressural contact with the inner filling;
   (h) a second flanged wheel supported by said framework and disposed on a second side of said conveyor belt, said wheel being adapted to rotate about an axis disposed generally perpendicular to the plane of said conveyor belt, and being adapted to fold a second portion of said conveyor belt transversely of the line of travel of the belt to move a second side portion of the tortilla into overlapping pressural contact with said first portion of the tortilla to form a shaped product wherein the inner filling is substantially encapsulated within the tortilla;
   (i) a plurality of longitudinally spaced apart rotatable flanged wheels carried by said framework intermediate said first and second flanged wheels adapted to maintain said first portion of said tortilla in pressural contact with the inner filling;
   (j) a plurality of longitudinally spaced apart rotatable flanged wheels carried by said framework forwardly of said second flanged wheel adapted to maintain said second portion of said tortilla in pressural contact with said first portion of said tortilla; and
   (k) a plurality of longitudinally spaced apart rotatable guide wheels carried by said framework adapted to engage said "V" shaped protuberance on said belt to guide longitudinal travel of said belt over said driving and driven drums.

2. An apparatus as defined in claim 1 including adjustable means carried by said framework for placing said conveyor belt under tension.

3. An apparatus as defined in claim 2 including safety means for moving said driven drum forwardly of the apparatus to instantaneously release the tension on said conveyor belt.

4. Apparatus for forming a food product characterized by having a generally circular shaped outer wrap formed about and substantially enclosing an inner filling comprising:
   (a) an elongated, loop shaped deformable conveyor belt for movably supporting a plurality of outer wraps sequentially along the length of said belt;
   (b) means for moving said conveyor belt at a predetermined rate of speed;
   (c) a dispensing means adapted to deposit a predetermined amount of filler material sequentially onto each of the wraps;
   (d) first means for moving said conveyor belt to sequentially fold the side portions of each of the wraps transverse to the line of travel of the conveyor;
   (e) second means cooperatively associated with said first means for moving a portion of said conveyor belt transverse to the line of travel of the belt to sequentially move a first side portion of each of the wraps into overlapping pressural contact with the filler;
   (f) third means for moving a portion of said conveyor belt transversely of the line of travel of the belt to sequentially move a second side portion of each of the wraps into overlapping pressural contact with said first portion of the wrap to form a shaped product wherein the filler material is substantially encapsulated within the wrap;
   (g) fourth means disposed intermediate said second and third means for maintaining said first portion of said wrap in pressural contact with the filler;
   (h) fifth means for inverting said product on said conveyor belt; and
   (i) sixth means disposed intermediate said third and fifth means for maintaining said second portion of said wrap in pressural contact with said first position of said wrap.

5. An apparatus as defined in claim 4 in which said second and third means comprise flange wheels disposed respectively on opposite sides of said conveyor belt with each of said wheels being adapted to rotate about an axis disposed generally perpendicular to the plane of said conveyor belt.

6. An apparatus as defined in claim 5 in which said fourth means comprises at least one flanged wheel disposed above said conveyor belt and being adapted to rotate about an axis substantially parallel to the plane of said conveyor belt.

7. An apparatus as defined in claim 6 in which said sixth means comprises at least one flanged wheel disposed above said conveyor belt and being adapted to rotate about an axis substantially parallel to the plane of said conveyor belt.

* * * * *